United States Patent
Liron

(10) Patent No.: US 7,013,361 B2
(45) Date of Patent: Mar. 14, 2006

(54) ROUTING SWITCHER WITH VARIABLE INPUT/OUTPUT ARCHITECTURE

(75) Inventor: John E. Liron, Rough and Ready, CA (US)

(73) Assignee: Grass Valley Group Inc., Nevada City, CA (US)

( * ) Notice: Subject to any disclaimer, the term of this patent is extended or adjusted under 35 U.S.C. 154(b) by 854 days.

(21) Appl. No.: 09/977,655

(22) Filed: Oct. 12, 2001

(65) Prior Publication Data

US 2002/0138684 A1 Sep. 26, 2002

Related U.S. Application Data

(60) Provisional application No. 60/264,208, filed on Jan. 24, 2001.

(51) Int. Cl.
*G06F 13/00* (2006.01)
*H04Q 11/00* (2006.01)

(52) U.S. Cl. .................. 710/316; 710/317; 340/386
(58) Field of Classification Search ............ 710/316, 710/317; 340/386–389
See application file for complete search history.

(56) References Cited

U.S. PATENT DOCUMENTS

| 4,673,933 A | * | 6/1987 | Bauer ...................... 341/22 |
| 5,200,746 A | * | 4/1993 | Yoshifuji ................ 340/2.22 |
| 6,335,930 B1 | * | 1/2002 | Lee ......................... 370/387 |
| 6,611,518 B1 | * | 8/2003 | Ngo et al. ............... 370/386 |

* cited by examiner

*Primary Examiner*—Khanh Dang
(74) *Attorney, Agent, or Firm*—Joseph S. Tripoli; Joseph J. Lake; Robert B. Levy

(57) ABSTRACT

Conventional routing switchers have employed a fixed architecture, i.e. the input and output connectors of the switching matrix are fixed in function. Prior art routing switchers use fixed matrix sizes. This invention uses a variable input/output architecture to enable multiple matrix sizes to be implemented in a single product. Switches are used to connect a subset of input and output connectors to either an input pin or an output pin. These switches allow users to select the number of input connectors and output connectors available for their particular application. The invention enables a single product to replace a range of routing switchers of different sizes. The user can also reconfigure the routing switcher size should application requirements change. This allows the user to configure the routing switcher matrix size to exactly meet the application requirements.

11 Claims, 3 Drawing Sheets

Routing Switcher with variable input/output architecture

Fig 1: Routing Switcher with variable input/output architecture

Fig 2: Larger Routing Switcher with variable input/output architecture

ROUTING SWITCHER WITH VARIABLE INPUT/OUTPUT ARCHITECTURE

CROSS-REFERENCE TO RELATED PATENT APPLICATIONS

This patent application claims the benefit of U.S. Provisional Patent Application Ser. No. 60/264,208, entitled "Routing Switcher With Variable Input/Output Architecture", filed Jan. 24, 2001.

FIELD OF THE INVENTION

The invention describes a variable input/output architecture for a routing switcher, whereby the number of input and output connectors can be varied.

BACKGROUND OF THE INVENTION

A routing switcher is a device that is used to direct signals from two or more input connectors/ports to one or more output connectors/ports through a manual or automated means. Routing switchers are used to manage a variety of signal types including analog audio, digital audio, analog video, and digital video.

Conventional routing switchers have employed a "fixed" architecture, meaning that connectors may function as either input or output connectors, but not both. The routing switcher of the present invention uses a "variable" architecture that allows a user to change the number of input and output connectors/ports available on a single switcher so that the single switcher may be used for different applications. The selection of the required architecture may be made by manual or automated means, and is accomplished by selecting the function of certain connectors, usually a subset of the total number of signal connectors, to be either input or output connectors.

When using manual means, the user manually defines the function of each connector as either input or output, using some hardware or software control. When using automated means, the user may specify the desired number of inputs and may be advised of the available number of outputs. Alternatively, the user may specify the desired number of outputs, and may be advised of the available number of outputs. The routing switcher control system uses this information to set the function of the appropriate connectors, usually at one time.

A routing switcher is contained in a frame. The frame is a rack-mountable metal enclosure that contains all the input, output, signal switching, and control electronics. The input, output and control interface connectors are located on the rear panel of the frame. The number of input pins receiving input data and output pins transmitting output data ranges greatly, depending on the application for which the routing switcher is used. A routing switcher includes a switching matrix (or "crosspoint matrix"). The terms "switching matrix" and "crosspoint matrix" are often used interchangeably. The switching matrix size is commonly defined as n×m where n equals the number of input pins (or sources), and m equals the number of output pins (or destinations). Switching matrices can be square (n=m), or rectangular (where usually n>m). Larger switching matrices (>32×32) tend to be square. This is true because when an application requires the deployment of a large routing switcher, e.g. as a plant central routing switcher, the number of input connectors and the number of output connectors required usually is approximately equal.

A plant central routing switcher is used to provide signal (e.g. video, audio) connectivity between all the equipment in the plant. The output signals of the equipment are connected to the input signal ports of the routing switcher; the output connectors of the routing switcher are connected to the input signal ports of the equipment. The routing switcher control system is used to select and implement signal paths between the signal output of one piece of equipment and the signal input of another. For routing switchers with switching matrices sized 32×32 or smaller, the number of input ports and output ports that are needed is much more dependent on the requirements of a specific application than usually is the case with routing switchers containing larger switching matrices. For example, a tape duplication facility may require a large number of output ports (to feed the tape recorders), and a much smaller number of input ports. A monitoring system, on the contrary, may require the monitoring of a large number of input port signals, and a much smaller number of output ports transmitting output data to monitoring stations.

Until now, manufacturers have produced a range of routing switchers of different sizes to satisfy diverse application requirements. Therefore, a routing switcher architecture that allows the user to switch the function of connectors so that they can function as either input or output connectors is needed. In this manner, a single routing switcher may be reconfigured to suit a variety of applications.

BRIEF SUMMARY OF THE INVENTION

The present invention includes of a routing switcher architecture that allows the user to switch the function of connectors so that they can function as either input or output connectors. Switches are used to connect a subset of input and output connectors to either an input pin or an output pin. These switches allow users to select the number of input connectors and output connectors available for their particular application. Each port is "bi-directional," as are the connectors terminating the ports. Bi-directional ports and connectors can function as both input and output ports/connectors, and a user selects their function for a particular application. A bi-directional port may be implemented by providing both an input port and an output port, and a switch to select the function required at any time. Alternatively, a bi-directional port may be implemented as a circuit element that incorporates input, output, and switching functions. An example of such a port suitable for serial video signals is discussed in the patent application for a "BI-DIRECTIONAL SERIAL VIDEO PORT," application Ser. No. 09/063,952, filed on Apr. 21, 1998, which is fully incorporated by reference herein. The present invention can be implemented using any form of bi-directional port, and in a variety of configurations/embodiments which may each allow for different numbers of input and output connectors.

DESCRIPTION OF THE INVENTION

The physical size of a switching matrix is largely determined by the space required by the input and output connectors. For example, in a 1 rack unit enclosure, it is possible to fit approximately 34 BNC connectors onto the back panel.

In the prior art, these connectors are fixed as either inputs or outputs. This invention describes a means of changing the function (input to output, or vice versa) of some number of these connectors to implement a range of matrix sizes within a single platform.

Figure 1:
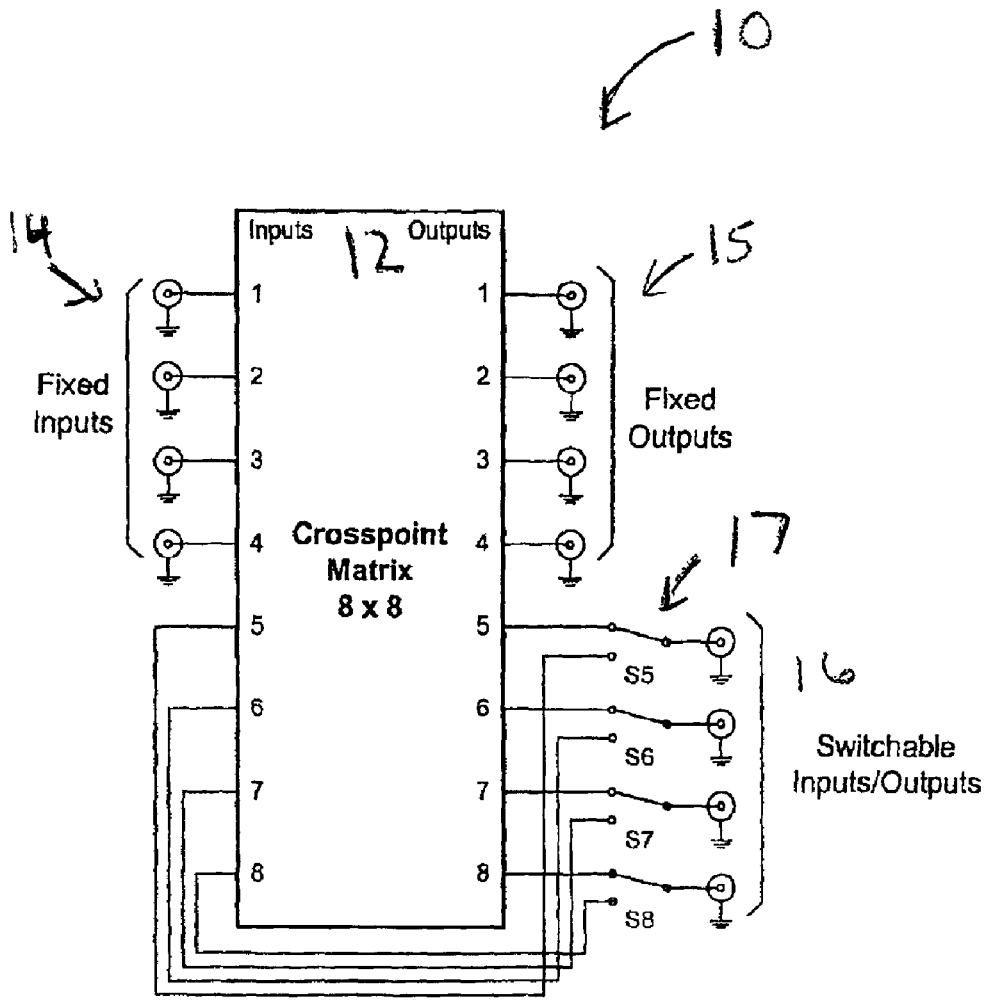
FIG. 1 shows a first embodiment of the routing switcher of the present invention.

FIG. 1 shows a routing switcher 10 containing a switching matrix 12 with 8 inputs and 8 outputs. Input connectors 14, numbered 1–4, are connected directly to input pins and function as "fixed" input connectors in the sense that they function solely as input connectors. Output connectors 15, numbered 1–4, are connected directly to output pins and function as fixed outputs. Input/output connectors 16 that can be switched are connected to switches 17, which are labeled (S5–S8) in FIG. 1. The common poles of the switches 17 (S5–S8) are connected to input/output connectors 16, which serve as either input or output connectors depending on the position of the switches 17 (S5–S8). The function of each of the four connectors 16 (input or output) is determined by the number of input and output connectors selected by the user. The operator determines the number of input and output connectors via an interface, such as a GUI, and signals generated by control software adjust switches 17 (S5–S8) so that the number of connectors connected to input or output pins on the switching matrix 12 equals the number of input and outputs connector determined.

The routing switcher depicted in FIG. 1 can be configured to operate in the following sizes by selecting various states of (S5–S8):

TABLE 1

| Number of Inputs | Number of Outputs |
| --- | --- |
| 8 | 4 |
| 7 | 5 |
| 6 | 6 |
| 5 | 7 |
| 4 | 8 |

Figure 3:
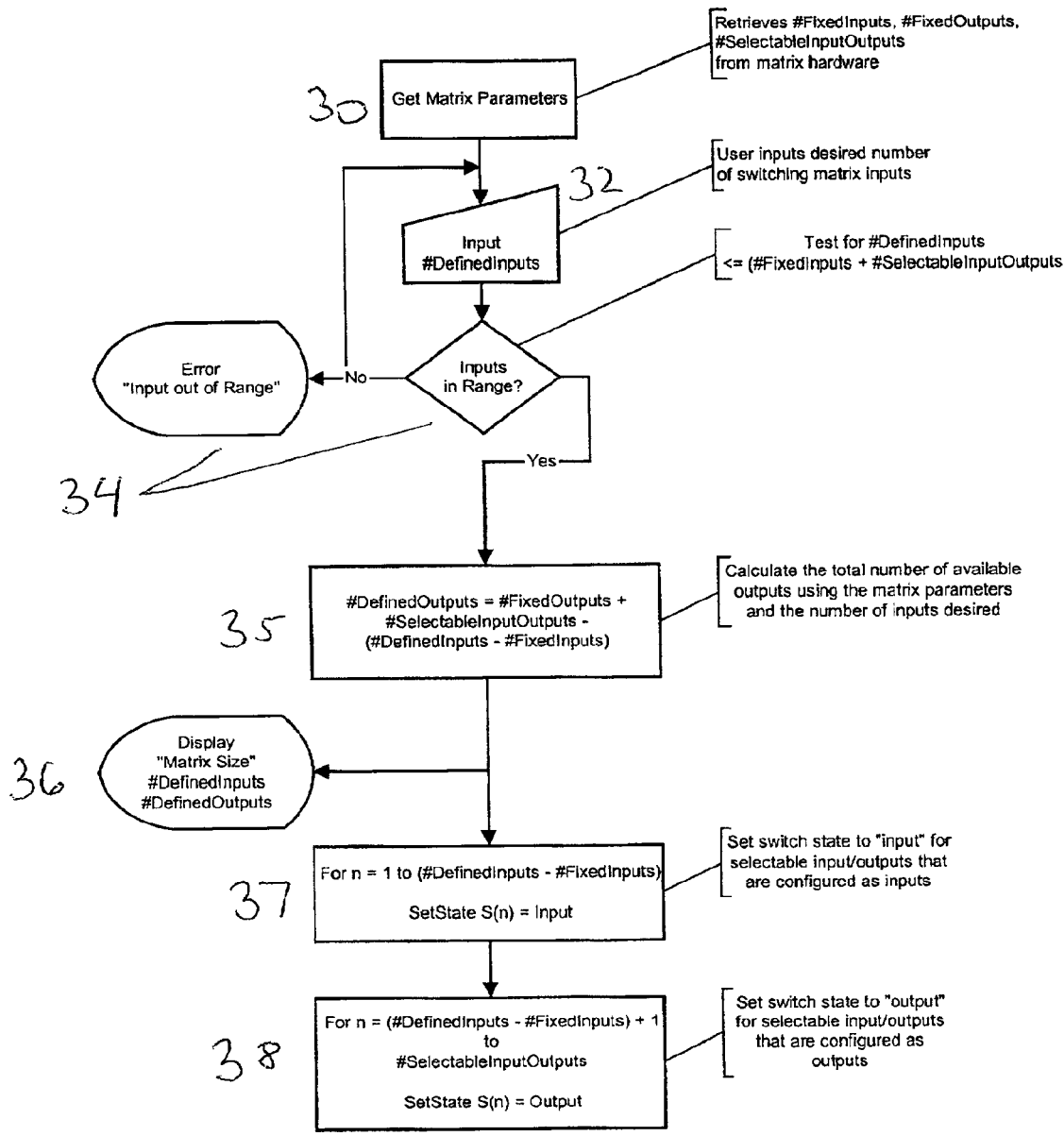
FIG. 3 shows a flowchart of an example process followed by the software to switch adjustable input/output connectors

The routing switcher 20 in FIG. 20 is representative of a typical practical application of the invention. The switching matrix 22 is a switch containing thirty-two inputs pins and eighteen output pins. Sixteen of the input are connected to input connectors 24 that have been dedicated to performing purely an input function. Two of the eighteen output pins are connected to output connectors 25 that have been dedicated to performing purely an output function—transmitting output signals from the switching matrix 22. The remaining 16 input/output connectors 27 may be switched from performing an input function to performing an output function or vice versa via switches S1–S16. The states of switches S1–S16 determine whether a particular connector will function as an input connector or as an output connector. The states of switches S1–S16 are selected by the user, either manually or via a routing switch control system, which is implemented with control software. One example of a process the software may follow in order to switch the operating mode of connectors is shown in FIG. 3.

Figure 2:
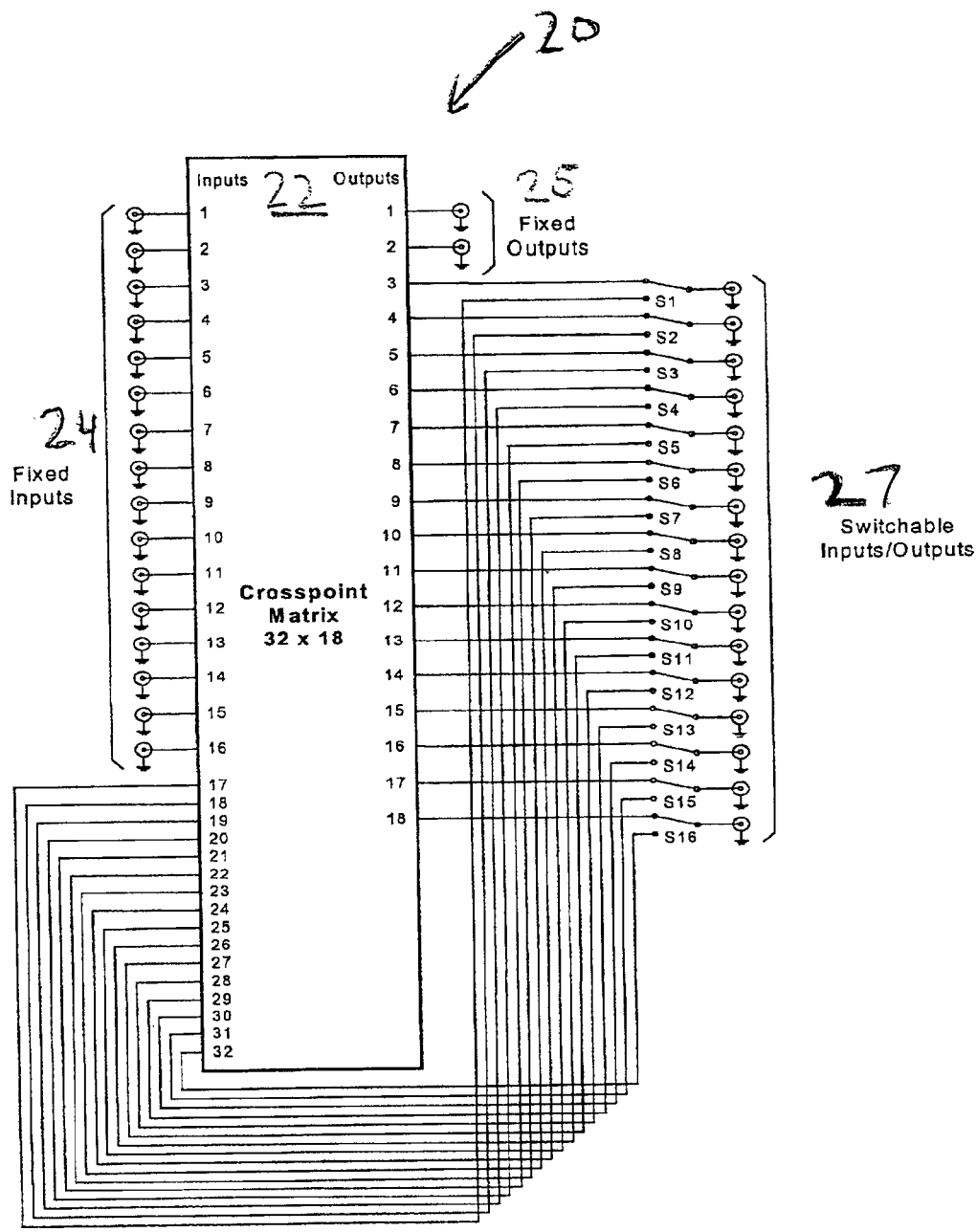
FIG. 2 shows a second embodiment of the routing switcher of the present invention.

The system shown in FIG. 2 can be configured to support the matrix sizes shown in the table below:

TABLE 2

| Number of Inputs | Number of Outputs |
| --- | --- |
| 32 | 2 |
| 31 | 3 |

TABLE 2-continued

| Number of Inputs | Number of Outputs |
| --- | --- |
| 30 | 4 |
| 29 | 5 |
| 28 | 6 |
| 27 | 7 |
| 26 | 8 |
| 25 | 9 |
| 24 | 10 |
| 23 | 11 |
| 22 | 12 |
| 21 | 13 |
| 20 | 14 |
| 19 | 15 |
| 18 | 16 |
| 17 | 17 |
| 16 | 18 |

Step 30 in the flowchart in FIG. 3 is the point at which the software retrieves the number of fixed inputs and outputs from the switching matrix hardware. At step 32, the software receives a number enter by the user through an interface, such as a Graphical User Interface (GUI), indicating the number of input connectors desired. At step 34, the software determines whether the number of input connectors entered by the user is valid. The number of input connectors entered may not exceed the sum of fixed input connectors and selectable input/output connectors available in the matrix configuration being used. If an invalid entry is made by the user, the software returns to step 32.

At step 35, the total number of output connectors available to the user is calculated indirectly by the following formula: Available Output Connectors=Fixed Output Connectors+Selectable Input/Output Connectors−(Input Connectors Desired−Fixed Input Connectors). At step 36, the number of Available Output Connectors and Desired Input Connectors is displayed. At step 37, some input/output connectors are switched to an input mode such that the number of connectors operating in an input mode equals the number of input connectors entered by the user at stage 32. At stage 38, some input/output connectors are switched to an output mode such that the number of connectors operating in an output mode equals the number of output connectors available to the user.

It will be clear to one practiced in the art that many variations are possible in such a control system. For example, step 35 could be omitted by pre-programming the numbers of each type of connector, or by allowing the user to select from a number of pre-determined connector configurations, or by requiring the user to enter the number of each type of connector. As another example, the user could be asked to enter the desired number of outputs, and be advised of the available number of inputs. Alternatively, the user could be allowed to select from a number of pre-determined input/output configurations. All such variations and implementations are included in the present invention.

The invention enables a single routing switcher to replace a variety of routing switchers of varying sizes. The fact that the present invention allows a single routing switcher to replace multiple routing switchers of different sizes increases manufacturing scale, i.e. in order to satisfy customer needs, a greater quantity of a single routing switcher configuration can be manufactured instead of smaller quantities of multiple routing switchers. This can reduce the amount of inventory carried by both manufacturers and distributors during the manufacturing and distribution processes. As Table 2 illustrates, the number of input and output connectors can be chosen very precisely for the routing switcher of the present invention—the number of input and output connectors can be varied by one within a range of possibilities to satisfy the requirements of different applications. Alternative implementations may employ a greater granularity, for example switching connectors in pairs rather than individually.

With conventional designs, users who must select routing switchers to meet specific requirements cannot precisely choose the number of input and output connectors that they want to use—they must use an off-the-shelf product that most closely mimics the input/output connector configuration they desire.

There exist many alternative embodiments of the present invention and alternative ways to implement the present invention, many of which may not be described explicitly herein but are covered by the actual purview of the claims.

The "switches" of the present invention that change the function of a given connector from one of receiving signals (input connector) to one of transmitting signals (output connector) or vice versa may be implemented as an electronic device that is not a switch which changes state in order to change the function of connectors. This implementation of the invention does not require a separate physical switch or electronic crosspoint. Furthermore, the "Bi-Directional Serial Video Port" application incorporated by reference herein embodies an approach that may be used to allow the present invention to transmit video signals.

What is claimed is:

1. A method of selectively connecting one of a plurality of input receiving wires and one of a plurality of output transmitting wires to one of a plurality of selectable connectors in a signal routing circuit, the method comprising:

retrieving data representing a number of non-selectable input connectors and non-selectable output connectors and selectable input/output connectors from the circuit;

receiving data through an interface from a user representing a number of desired input connectors each to be connected to an input receiving wire;

comparing said number of desired input connectors to the sum of said non-selectable input connectors and a plurality of selectable input/output connectors;

repeating said receiving and comparing until the sum of said non-selectable input connectors and the plurality of selectable input/output connectors equals or exceeds the number of said desired input connectors;

calculating the number of available output connectors by adding the number of non-selectable input connectors, non-selectable output connectors, and selectable input/output connectors together and subtracting the number of desired input connectors therefrom;

displaying the number of available output connectors and desired input connectors using a display mechanism;

repeatedly connecting a selectable input/output connector to an input receiving wire until the sum of said non-selectable input connectors and the selectable input/output connectors connected to an input receiving wire equals the number of said desired input connectors;

repeatedly connecting all selectable input/output connector not so connected to an input receiving wire to an output transmitting wire.

2. The method of claim 1, wherein said circuit receives and transmits video signals.

3. The method of claim 1, wherein said circuit receives and transmits audio signals.

4. The method of claim 1, wherein said circuit receives and transmits data signals.

5. The method of claim 1, wherein said circuit has output pins that may be connected to more than one connector.

6. Apparatus for routing signals, comprising a cross point matrix for routing signals having a plurality of inputs and at least one first output and at least one other output, the cross-point matrix providing a unidirectional routing path between at least one input to at least one output;

a plurality of non-switchable input-only ports each receiving a respective input signal for transmission to a corresponding one of a first subset of cross point matrix inputs;

at least one non-switchable output only port for receiving an output signal from the first cross point matrix output;

at least one bidirectional port capable receiving an input signal or transmitting an output signal; and at least one switching means switching the at least one bidirectional port between a respective one of a second sub-set of cross point matrix inputs and the at least one other cross point matrix output.

7. The apparatus according to claim 6 wherein the cross-point matrix has multiple other outputs; and further comprising:

a plurality of bidirectional ports, each capable receiving an input signal or transmitting an output signal; and a plurality of switching means, each switching a respective one of said plurality of bidirectional ports between a respective one of a second sub-set of cross point matrix inputs and a respective one of the plurality of other cross point matrix outputs.

8. The apparatus of claim 6 wherein said cross-point matrix, said input-only ports, said at least one output-only port, said at least one bi-directional port and said at least one switching means are housed in a single frame.

9. The apparatus of claim 6, wherein said cross-point matrix routes video signals.

10. The apparatus of claim 6, wherein said cross-point matrix routes audio signals.

11. The apparatus of claim 6, wherein said cross-point matrix routes video and audio signals.

* * * * *